Patented Feb. 1, 1938

2,107,059

UNITED STATES PATENT OFFICE 2,107,059

MOTOR FUEL COMPOSITION

Franz Rudolf Moser, Amsterdam, Netherlands, assignor to Shell Development Company, San Francisco, Calif., a corporation of Delaware No Drawing. Application May 11, 1935, Serial No. 20,987. In Great Britain May 16, 1934

6 Claims. (Cl. 44—9)

This invention relates to a liquid fuel composition for internal combustion engines with fuel injection at the end of the compression stroke, and to a process for preparing said composition, and is more specifically concerned with further improvements and modifications of the invention disclosed and claimed in my application Serial No. 709,948, filed February 6, 1934.

In the operation of compression ignition engines of the Diesel and semi-Diesel types, and especially in the case of high-speed engines of said types, a relatively long period of time often elapses between the injection and the ignition of the fuel.

It has already been proposed to remedy this defect by subjecting the fuel to a treatment such as ozonizing, or by adding thereto an ignition agent having the property of exploding at a temperature below the ignition temperature of the fuel. Such agents are, for example, the decomposition products of percarbonates, perborates and persulfates, or such compounds as hydrogen peroxide, benzoyl peroxide, etc.

These substances, however, have many drawbacks: they are dangerous to handle, they are unstable and decompose readily at ordinary temperatures, necessitating the use of various stabilizing agents such as organic amido-derivatives, and, finally, they do not dissolve to a sufficient degree in the fuel to bring about any improvement. This necessitates either the use of additional agents to dissolve said peroxides, or of elaborate methods to disperse them in the fuel.

In my above-mentioned application Serial No. 709,948 it has been disclosed that the ignition properties of Diesel fuels, as expressed by their cetene numbers, can be considerably improved by the addition thereto of small quantities of tretraline peroxide.

I have now found that even a greater improvement of Diesel fuel oils may be effected through the addition thereto of a small quantity of a ketone or an aldehyde peroxide, or of a mixture thereof. The term ketone peroxide or aldehyde peroxide, as used in this application, designates an organic peroxide obtained by the reaction of hydrogen peroxide upon a ketone or an aldehyde by any suitable method, such, for example, as the process described in my copending application Serial No. 11,667, filed March 18, 1935.

Suitable organic compounds which may be used as starting material for the preparation of ketone or aldehyde peroxides are, for example: acetone, methyl ethyl ketone, diethyl ketone, methyl isopropyl ketone, methyl secondary butyl ketone, methyl tertiary butyl ketone, aromatic ketones such as aceto-phenone, benzo-phenone, benzylethyl ketone, benzylnaphthyl ketone, and homologues and analogues thereof; aliphatic aldehydes, such as formaldehyde, acetaldehyde, propionaldehyde, isobutyraldehyde, methyl ethyl acetaldehyde, trimethyl acetaldehyde, and the like; aromatic aldehydes, as benzaldehyde, toluic aldehydes, cuminol, naphthaldehyde, etc.; and aldehyde-ketone, including both aliphatic and aromatic compounds as pyroracemic aldehyde, isopropyl glyoxal, formyl acetone, laevulinic aldehyde, and the like. Polyketonic and polyaldehydic compounds corresponding to the above may also be used, for example, diacetyl, acetyl propionyl, acetyl acetone, acetonyl acetyl acetone, glyoxal, succinic dialdehyde, mesoxalic dialdehyde, phenyl - methyl - triketone. Furthermore, such compounds may contain substituents as halogen (as in chloral, monochloracetone and the like) nitro, i. e. $NO_2$, groups (as m-nitro benzaldehyde, etc.) and the like.

Of the compounds listed above, the peroxides obtained from ketones were found to be particularly effective, and may therefore especially well be used for raising the cetene numbers of Diesel fuels. It must be pointed out that these ketone peroxides are capable, on hydrolysis, of reverting to ketones, and are therefore radically different from such compounds as, for example, benzoyl peroxide, which, being an acid peroxide, reverts to acid on hydrolysis. Compounds such as benzoyl peroxide, as has been stated above, are generally unsuitable or unsatisfactory for the purposes of this invention.

The magnitude of the effect of the peroxides of the various ketones on the ignition qualities of Diesel fuels was found to depend to a certain degree on the molecular weight of the ketones, the peroxides of ketones of low molecular weight being the most effective. I therefore prefer to use for my process the peroxides of such low molecular weight ketones. For example, acetone peroxide is eminently suitable for improving Diesel fuel oils, and this invention will therefore be further described with particular reference to this compound, without, however, being in any way limited thereto, since acetone peroxide is used only as an illustrative example of the ketone and aldehyde peroxides which may be used according to my process.

The term acetone peroxide is directed to the compound $(C_3H_6O_2)_n$, where $n$ is equal to 2 or 3, since the product occurs in dimolecular as well as trimolecular form. It is understood that either of these forms, as well as a mixture thereof in any proportions is included in the term acetone peroxide as used herein. The trimolecular form has proved to be the most suitable for the object of this invention.

Acetone peroxide can be added to various oils to be used as Diesel fuels, such as gas oil, solar oil, Edeleanu kerosene extract, heavy pressure distillate, coal tar fractions, etc.

The quantities to be added depend on the kind and the grade of the fuel oil to be improved, and on the magnitude of the effect which it is desired to produce. In general, small quantities of the order of 0.5 to 1% are sufficient, since acetone peroxide, being a very effective agent, causes a much more considerable improvement in the cetene numbers of Diesel fuels than it would be possible to achieve by such methods as ozonization, or by the addition of equal amounts of such agents as hydrogen, benzoyl or even, in some cases, tetraline peroxide, as will be seen from the following table:

Table 1

| Fuel oil | Cetene numbers | | | |
|---|---|---|---|---|
| | Blank sample | Ozonized | With 1% tetraline peroxide | With 1% acetone peroxide |
| No. 1 | 39 | | 45 | 55 |
| No. 2 | 41 | 40 | 44 | 49 |
| No. 3 | 44 | 44 | 47 | 49 |
| No. 4 | 67 | 69 | 80 | 85 |

It will be seen from this table that both low grade (oil No. 1) and relatively high grade (oil No. 4) oils can equally well be improved by the method of this invention. It may however, be stated that the use of acetone peroxide is especially advantageous in the case of low-grade Diesel fuels, or in cases when an especially great increase in cetene numbers is desired, and the addition of a correspondingly large quantity of an ignition agent, such as 4 or 5%, is therefore necessary. Owing to their low solubility in hydrocarbon oils, most of the peroxides, such as hydrogent or benzoyl peroxides, cannot be added to fuel oils in these proportions, and are therefore unsuitable in such cases, while no such disadvantage is attached to the use of acetone peroxide due to its greater solubility in hydrocarbon oils, as shown in the following table:

Table 2

| Fuel oil | Solubility at 68°F. | |
|---|---|---|
| | Benzoyl peroxide | Acetone peroxide |
| | Percent | Percent |
| No. 5 | 2.5 | 8.4 |
| No. 6 | 3.7 | 8.6 |

Thus, a solar oil from an East Indies crude, having an original low cetene number of 31, was improved by the addition of acetone peroxide as follows:

Table 3

| Percent of acetone peroxide added | Cetene number |
|---|---|
| Percent | |
| 0.25 | 35 |
| 0.50 | 37 |
| 1.0 | 39 |
| 2.0 | 49 |
| 4.0 | 56 |

No such results could have been obtained, for example with benzoyl peroxide, since its limit of solubility in the oil was about 2.5%.

Being readily soluble in oil, acetone peroxide may be handled and added to the oil either in concentrated form, or in the form of a relatively dilute solution in a hydrocarbon or other organic solvent. Acetone peroxide in itself is a comparatively explosive compound, but there is no danger of explosion if it is dissolved in oil. In that connection it may be stated that although acetone peroxide may be prepared by any known method, a preferred way of achieving the purpose of this invention consists in extracting it with oil out of a mixture of sulfuric acid, persulfuric acid, and acetone, thereby obtaining a concentrated oil solution of acetone peroxide without isolating the acetone peroxide itself and thereby incurring the danger of an explosion. The steps in this procedure may be briefly described as follows:

(1) A solution of persulfuric acid in sulfuric acid is obtained by electrolysis.

(2) The solution is hydrolyzed by brief heating, for example, 1 minute at 200–220° F., and then cooled to about −5° F. while adding acetone and stirring, (3) The acetone peroxide formed is extracted from the cooled mixture with a hydrocarbon oil.

It is of course evident that the peroxides of the other ketones and aldehydes listed above may be prepared by a similar process.

A fuel oil improved by the method of this invention possesses very good stability and retains its desirable properties during long periods of storage as will be shown by the following example:

Into a Venezuelan gas oil with a natural cetene number of 47 was incorporated 1% of acetone peroxide, the cetene number being thereby raised to 58. After being stored for one month at normal room temperatures, it showed no decrease in its active oxygen content and its cetene number; after a subsequent storage of over two months in contact with iron and zinc, it still retained a cetene number of 57.

It may be added that it is likewise possible to effect a considerable improvement in the ignition properties of Diesel fuels by adding thereto a small amount of an aldehyde or a ketone peroxide, such, for example, as acetone peroxide, in admixture with certain other substances having the property of improving the quality of the fuel oil, such as tetraline peroxide, nitrogen sulfide, esters of nitric or nitrous acids, etc., since the effectiveness of the latter agents becomes incommensurably greater in admixture with ketone or aldehyde peroxides and especially with acetone peroxide.

In defining herein the ignition values of Diesel fuels, cetene numbers have been used throughout, reference being made to an article of G. D. Boerlage and J. J. Broeze: "Ignition Quality of Diesel Fuels as Expressed in Cetene Numbers," published in the issue for July, 1932 of the S. A. E. Journal.

I claim as my invention:

1. A liquid fuel for compression ignition engines containing small quantities of acetone peroxide added thereto.

2. The composition of claim 1 containing less than about 5% of acetone peroxide added thereto.

3. The composition of claim 1, containing from ½ to 1% of acetone peroxide added thereto.

4. A liquid fuel for compression ignition engines containing a small quantity of acetone peroxide and a small quantity of a substance selected from the group consisting of tetraline peroxide, nitrogen sulfide, esters of nitric acid and esters of nitrous acid added thereto.

5. In the process of preparing a liquid fuel for compression ignition engines the step of adding small quantities of acetone peroxide to the fuel.

6. A composition of matter comprising a liquid hydrocarbon motor fuel component and a relatively small quantity of acetone peroxide.

FRANZ RUDOLF MOSER.